United States Patent [19]

Hamada et al.

[11] Patent Number: 4,722,581
[45] Date of Patent: Feb. 2, 1988

[54] RECORDING APPARATUS WITH A SEMICONDUCTOR LASER

[75] Inventors: Akiyoshi Hamada, Toyokawa; Katsumi Miwa, Machida, both of Japan

[73] Assignee: Minolta Camera Kabushiki Kaisha, Osaka, Japan

[21] Appl. No.: 799,915

[22] Filed: Nov. 20, 1985

[30] Foreign Application Priority Data

Nov. 22, 1984 [JP] Japan ............... 59-247277

[51] Int. Cl.⁴ ........................... G02B 26/04
[52] U.S. Cl. ................... 350/6.8; 350/449
[58] Field of Search ........... 350/6.8, 6.7, 255, 360, 350/361, 271, 449, 272; 354/228, 270, 272

[56] References Cited

U.S. PATENT DOCUMENTS

| | | | |
|---|---|---|---|
| 4,222,653 | 9/1980 | Beiser | 354/270 |
| 4,253,724 | 3/1981 | Minoura et al. | 350/6.8 |
| 4,304,467 | 12/1981 | Rabedeau | 350/449 |
| 4,333,173 | 6/1982 | Yonezawa et al. | |
| 4,397,527 | 8/1983 | Geyer | |
| 4,538,895 | 9/1985 | Higgins et al. | |

OTHER PUBLICATIONS

Lenses for Low-Order Modes, by Richard Rhyins, Laser Focus, Jun. 1974.

*Primary Examiner*—John K. Corbin
*Assistant Examiner*—Loha Ben
*Attorney, Agent, or Firm*—Price, Gess & Ubell

[57] ABSTRACT

Disclosed is a recording apparatus having a semiconductor laser producing a laser beam with Gauss distribution and an aperture stop. The aperture stop has a diameter in the direction normal to a junction plane of the semiconductor laser which is adjustable to a suitable value and a diameter in the direction parallel to the junction plane is fixed at a predetermined value. This aperture stop transmits the beam in regulated form with minimum loss of energy propagation efficiency.

8 Claims, 15 Drawing Figures

RECORDING APPARATUS WITH A SEMICONDUCTOR LASER

BACKGROUND OF THE INVENTION

Field of the Invention

1. The present invention relates to a recording apparatus for use with a semiconductor laser, and more particularly to such a recording apparatus having a beam shaping diaphragm.

Description of the Prior Art

2. Recording apparatus incorporating a semiconductor laser are adapted for scanning a record medium with a laser beam while modulating the laser beam to form an image on the record medium. Such apparatus heretofore proposed or provided include laser beam printers wherein an electrostatic image is formed on a photoconductive member serving as the record medium and is then processed by a known electrophotographic process, and others wherein a silver salt film is used as the record medium. With these apparatus, it is necessary to suitably control the diameter and shape of the laser beam for forming images on the record medium in order to obtain a high resolution which is essential in handling an increased amount of information and providing copy images of improved quality.

In recent years, semiconductor lasers have found wide use as laser sources having the advantages of being of a small-size and highly efficient, having high stability and being adapted for direct modulation. However, semiconductor lasers have a drawback in that the divergence angle of the beam emitted differs greatly from laser to laser for the reasons involved in the fabrication process thereof.

With reference to FIG. 1, a semiconductor laser 1 has an active region T which is very narrow in a direction perpendicular to the junction face, so that the beam emitted by the laser exhibits an elliptical far field pattern. Although the divergence angle of the beam in a direction (X-direction) parallel to the junction face of the laser is controllable with relatively high precision to eliminate the differences between individual lasers, the divergence angle in the direction (Y-direction) perpendicular to the junction face varies greatly because the angle in this direction is dependent on the growth conditions for the semiconductor which are difficult to control.

Use of semiconductor lasers having such individual variations and an elliptical far field pattern results in a reduced resolution.

U.S. Pat. No. 4,538,895 discloses a proposal for eliminating the above drawback. The proposal employs a collimator lens of an achromatic doublet structure and an aperture disposed in front or rear of the lens and having different diameters in horizontal and vertical directions to overcome the drawback and remedy astigmatism. Although the U.S. Patent specification does not specifically indicate, the collimator lens used is one having a large F No., presumably, of at least F No. 3. The beam emergent from such a collimator lens forms an Airy image of approximately uniform intensity distribution. With this system, the variation of divergence angle can be corrected merely by fixedly providing an aperture of predetermined size, while astigmatism can also be inhibited. Nevertheless, the proposed system has the drawback of impaired energy propagation efficiency.

SUMMARY OF THE INVENTION

Accordingly, the main object of the present invention is to provide a recording apparatus incorporating a semiconductor laser wherein the variation in the divergence angle of the laser beam can be corrected without reducing the energy propagation efficiency.

Another object of the present invention is to provide a recording apparatus incorporating a semiconductor laser wherein the laser beam can be made to propagate substantially in the form of a Gaussian beam, and the variation in the divergence angle of the beam can be corrected.

The above and other objects of the present invention can be fulfilled by a recording apparatus having a semiconductor laser for scanning a record medium thereacross with a beam emitted by the laser, the apparatus being characterized in that the semiconductor laser emits a Gaussian beam, the apparatus comprising a collimator lens having an F No. of up to 1.5 for collimating the beam, and a diaphragm disposed within the path of propagation of the beam and having an aperture, the diaphragm aperture having a variable diameter of up to 2 Do in a direction perpendicular to the junction face of the semiconductor laser and a predetermined fixed diameter of at least 1.8 Do in a direction parallel to the junction face, Do being the diameter of the beam at a position where the beam intensity is $e^{-2}$ times the beam intensity at the center of the beam.

BRIEF DESCRIPTION OF THE DRAWINGS

These and other objects or features of the present invention will become apparent from the following description of a preferred embodiment thereof taken in conjunction with the accompanying drawings, in which.

DESCRIPTION OF THE PREFERRED EMBODIMENT

Figure 1:
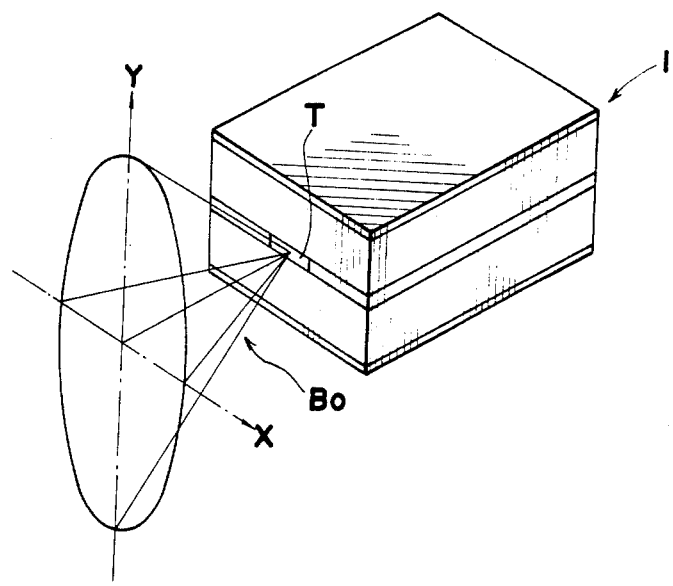
FIG. 1 is a perspective view showing the shape of a beam emitted by a semiconductor laser.
Figure 2:
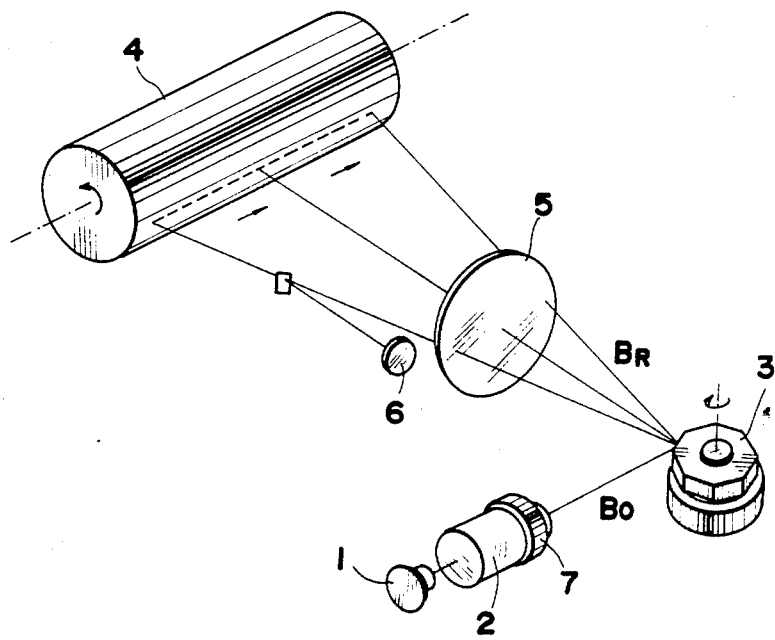
FIG. 2 is a perspective view schematically showing a laser beam printer to which the present invention is applied.

FIG. 2 schematically shows the construction of a laser printer embodying the present invention. With reference to the drawing, a semiconductor laser 1 produces a Gaussian beam, which propagates through a collimator lens 2, a diaphragm 7, a polygonal mirror 3 and an fθ lens 5 and impinges on a photosensitive drum 4. The collimator lens 2 collimates the incident beam to a beam of parallel rays and has an F number of up to 1.5. Such a collimator lens passes a Gaussian beam almost as it is. The polygonal mirror 3 is drivingly rotated by an unillustrated motor to reflect and sweep the incident beam BO. The beam BR from the mirror 3 is subjected to an image forming action of the fθ lens 5 and is focused in the form of a spot on the drum 4 while moving straight. The drum 4 is uniformly sensitized by an unillustrated charger, and an electrostatic image is formed thereon owing to the modulation of the semiconductor laser. The image is processed by a known electrophotographic process. Indicated at 6 is a beam sensor for giving an SOS signal which determines the start-of-scan position on each scan line.

Figure 3:
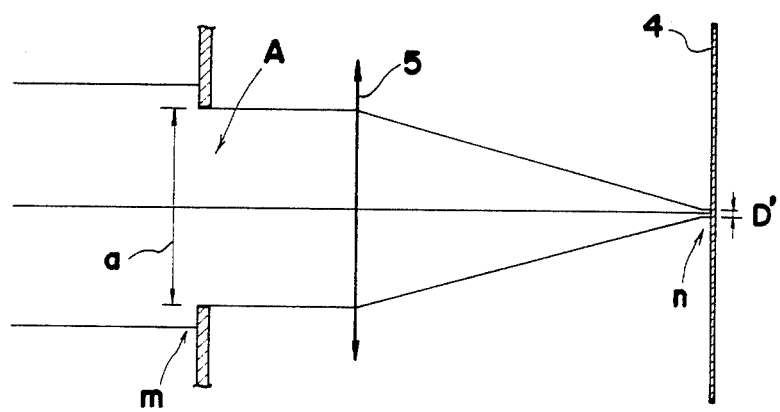
FIG. 3 is a diagram for schematically illustrating the present invention.
Figure 4A:
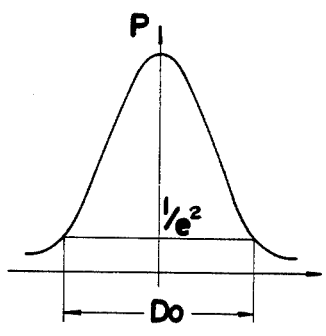
FIG. 4A is a diagram showing the distribution of beam intensities at point m in FIG. 3, and FIGS. 4B and 4C are diagrams showing a beam intensity distribution at point n in FIG. 3.
Figure 4B:
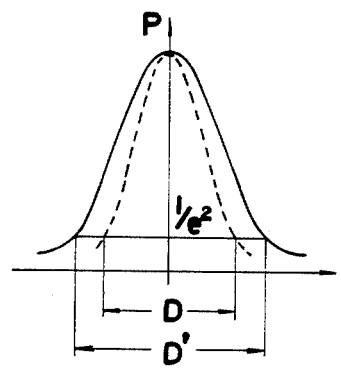

FIG. 3 is a development schematically showing the structure of FIG. 2. The diameter of the beam focused on the drum 4 alters with the variation of the diameter a of the aperture A of the diaphragm 7 provided in the path of propagation of the beam. FIG. 4A shows the distribution of intensities of the laser beam at point m in FIG. 3, i.e., of the incident beam at the aperture A. It is assumed that the beam has a diameter Do at the position where the beam intensity is $e^{-2}$ times the central intensity of the beam. FIG. 4B shows the distribution of laser beam intensities at point n in FIG. 3, i.e., at the image forming plane. D is the spot diameter of the beam in the absence of the aperture A, and D' is the spot diameter of the beam when the aperture A is provided.

Figure 5:
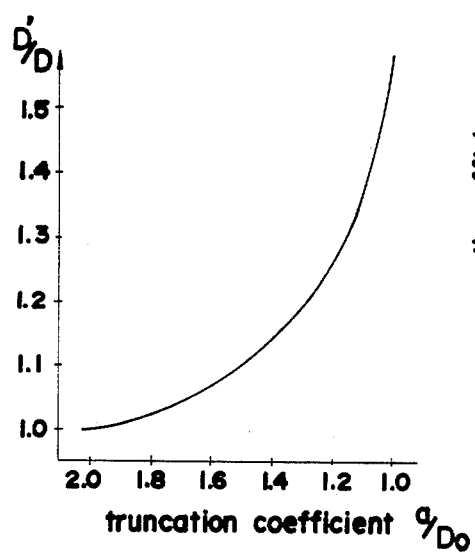
FIGS. 5 and 6 are graphs for use in describing the invention.

FIG. 5 is a graph showing the relationship between a/Do and D'/D. a/Do is a coefficient indicating the influence of truncation by the aperture A and will hereinafter be termed "truncation coefficient." On the other hand, D'/D shows the ratio of increase of the spot diameter due to the presence of the aperture A.

Figure 6:
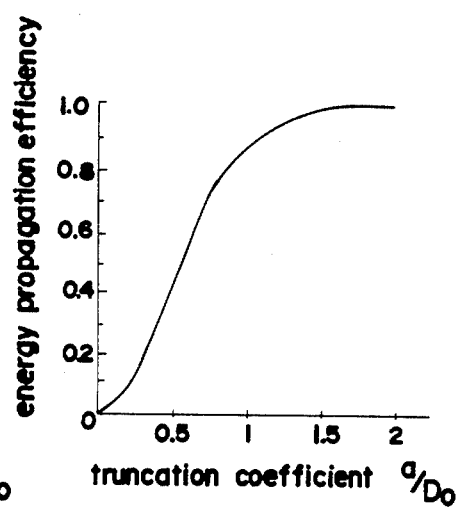

FIG. 6 is a graph showing the relationship between the truncation coefficient and the energy propagation efficiency which is expressed by:

$$\tau = 1 - \exp\left[\frac{2a}{Do^2}\right]$$

Figure 4C:
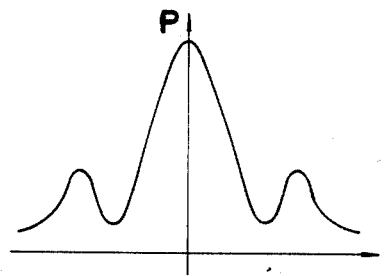

FIGS. 5 and 6 show that in the region where the truncation coefficient is not smaller than 1.8, the influence of truncation by the aperture A is almost negligible, assuring satisfactory propagation of energy. In the region where the truncation coefficient is up to 2, on the other hand, it is seen that the increase ratio D'/D of the spot diameter increases with decreasing truncation coefficient, i.e., with a decrease in the diameter a of the aperture A. FIG. 6 shows that when the truncation coefficient is smaller than 1.0, the energy propagation efficiency decreases markedly. Further if the coefficient is smaller than 0.5, the beam exhibits an Airy distribution having subpeaks as shown in FIG. 4C.

In view of the above findings, the diaphragm of the present invention is made to have a variable aperture diameter in the truncation coefficient range of up to 2.0, in a direction perpenedicular to the junction plane of the semiconductor to correct the variation of the divergence angle. In a direction parallel to the junction plane, the diaphragm aperture has a predetermined fixed diameter in the truncation coefficient range of not smaller than 1.8 to assure the propagation of energy with the highest possible efficiency. The range of variable diaphragm aperture diameter in the perpendicular direction is 0.5 to 2.0, preferably 1.0 to 1.8, in terms of truncation coefficient.

Figure 7:
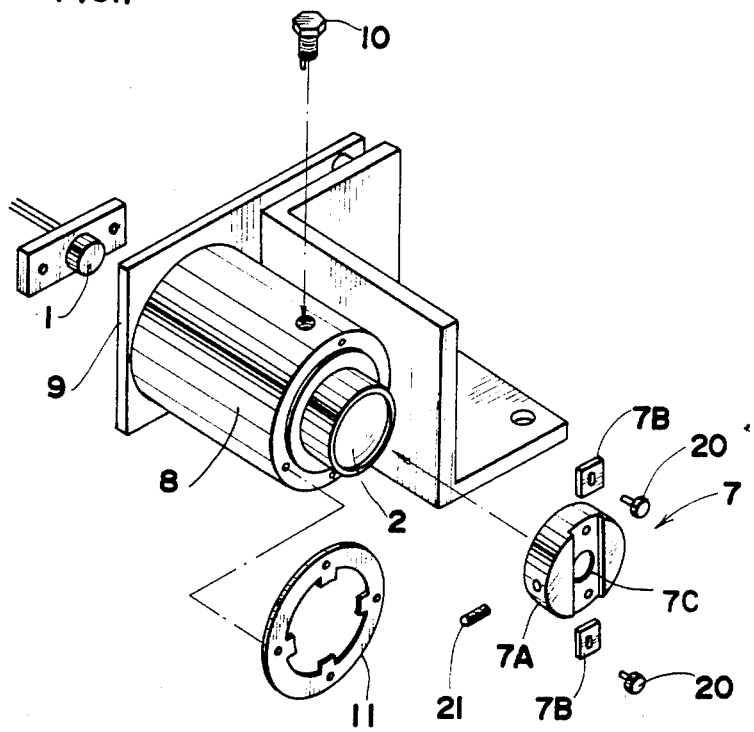
FIG. 7 is a perspective view showing the structure of a diaphragm of the invention.

FIG. 7 shows the construction of the diaphragm 7 more specifically. The diaphragm 7 is fitted in the barrel of the collimator lens 2. Attaching the diaphragm to the collimator lens in this way has the advantage of eliminating the need to adjust the position of the diaphragm because the collimator lens has been adjusted in position relative to the optical axis. The diaphragm 7 comprises a cylindrical member 7A having a circular opening 7C, and flat plates 7B, 7B vertically movably as fitted in a groove in the front side of the member 7A. Each flat plate 7B is fastened to the member 7A by a screw 20 inserted through a slot formed in the plate 7B. When the screws 20 are loosened, the flat plates 7B, 7B are movable upward or downward relative to the circular opening 7C. The member 7A is first fitted in the barrel of the collimator lens 2 and then fixed thereto by a screw 21. Before the member 7A is fixed in position, the direction of movement of the flat plates 7B, 7B is made to agree with the direction perpendicular to the junction plane of the semiconductor laser 1. The drawing further shows a lens holder 8 which is fixed to a lens retainer 9, an eccentric screw 10 for moving the collimator lens 2 forward or rearward relative to the holder 8 for focus adjustment, and a spring member 11 for pressing the collimator lens 2 against the holder 8.

With the arrangement described above, the circular opening 7C has a diameter about 1.8 times the beam diameter Do, while the distance between the flat plates 7B, 7B is variable from about 1.8 times to about 0.5 times the beam diameter Do. The variation in the divergence angle of the beam is corrected by adjusting the distance between the flat plates 7B, 7B.

Figure 8A:
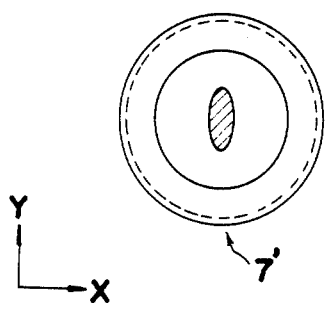
FIGS. 8A, 9A and 10A are diagrams showing diaphragm in open state.
Figure 8B:
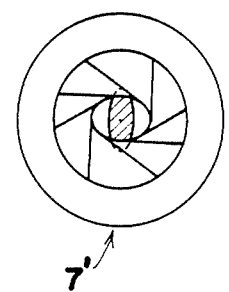
FIGS. 8B, 9B and 10B are diagrams showing diaphragm in stopped down state.
Figure 9A:
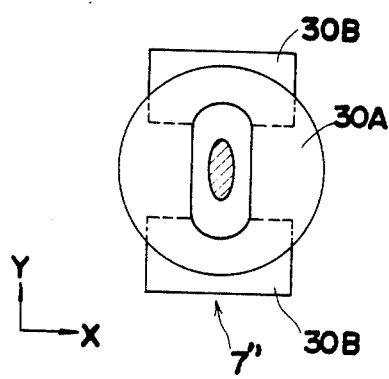
Figure 9B:
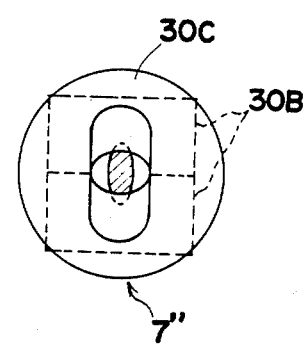
Figure 10A:
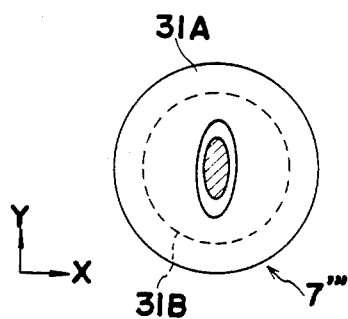
Figure 10B:
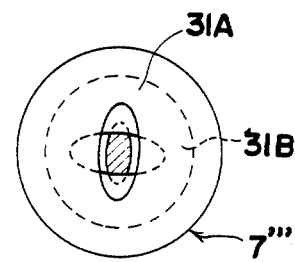

FIGS. 8 to 10 show modifications of the diaphragm 7. In each of these drawings, A shows the diaphragm in open state, and B shows the same as stopped down. The hatched portion represents the incident beam. The X-direction shown is in parallel with the junction plane of the semiconductor laser, while the Y-direction is perpendicular thereto.

The diaphragm 7' shown in FIG. 8 is an elliptical iris diaphragm comprising a plurality of diagraphm blades in combination. The diameter of the diaphragm aperture is variable in the Y-direction while remaining unchanged in the X-direction.

FIG. 9 shows a diaphragm 7" comprising a member 30A having a circular opening which is elongated in the Y-direction, and flat plates 30B, 30B having a circular arc recess in conformity with the circular arc portion of the elongated circular opening in shape. The flat plates 30B, 30B are movable in the direction of the major diameter of the elongated circle (i.e. in the Y-direction). When thus moved, the flat plates 30B, 30B alter the shape of the diaphragm aperture to a vertically elongated circle, a precise circle or a horizontally elongated circle.

FIG. 10 shows a diaphragm 7'" comprising two discs 31A, 31B each having an elliptical opening. While remaining unchanged in the X-direction, the diameter of the aperture is variable in the Y-direction by rotating one of the discs.

The present invention has been described above based on the assumption that since the collimator lens 2 used has a small F No., the beam from the semiconductor laser 1 passes through the collimator lens 2 almost as it is. However, even collimator lenses have a slight diaphragm action, so that the truncation coefficient of the collimator lens 2 itself will be evaluated. The F No. of the lens is given by F No.=f/a where f is the focal length, and a is the aperture diameter. The beam diameters Dr and Dp in the direction perpendicular to the junction plane and in the direction parallel thereto at the lens aperture position are calculated from $Dr=2f\sin\theta r$ and $Dp=2f\sin\theta p$ wherein $\theta r$ and $\theta p$ are the divergence angles (half angles) of the beam from the semiconductor laser in the perpendicular direction and the parallel direction. The beam diameters and the divergence angles are in terms of $e^{-2}$ values. From these equations, the truncation coefficients in the perpendicular direction and the parallel direction are given by:

$$\frac{a}{Dr} = [2 \cdot F\text{No.} \cdot \sin\theta r]^{-1}, \text{ and } \frac{a}{Dp} = [2 \cdot F\text{No.} \cdot \sin\theta p]^{-1},$$

respectively.

Listed below are truncation coefficient values given by various conbinations of F numbers and divergence angles.

| Case | a/Dr | a/Dp | F No. | $\theta r$ | $\theta p$ |
|---|---|---|---|---|---|
| I | 1.5 | 3.2 | 1.5 | 13° | 6° |
| II | 1.7 | 3.7 | 0.6 | 30° | 13° |
| III | 1.9 | 3.6 | 0.9 | 17° | 9° |
| IV | 1.4 | 4.0 | 0.9 | 24° | 8° |

The table reveals that when a collimator lens having an F No. of up to 1.5 is used, the truncation coefficient of the lens per se is up to 2.0 in the direction perpendicular to the junction face and at least 1.8 in the parallel direction, thus fulfilling the foregoing requirement. Accordingly, it is unlikely that the beam will fail to meet the requirement before entering the diaphragm of the present invention. Thus, satisfactory correction can be achieved by the diaphragm of the invention.

Although the present invention has been fully described by way of the examples with reference to the accompanying drawings, it is to be noted that various changes and modifications will be apparent to those skilled in the art. Therefore, unless otherwise such changes and modifications depart from the scope of the present invention, they sould be construed as being included therein.

What is claimed is:

1. A recording apparatus with a semiconductor laser light source for producing a laser beam, said apparatus being adapted to scan the beam across a recording medium and comprising:
    said semiconductor laser light source producing the beam with Gauss distribution;
    a collimator lens for collimating the beam produced by the light source and having an F number equal to or less than 1.5; and
    an aperture stop provided just behind the collimator lens and having a first diameter in direction normal to a junction plane of said semiconductor laser which is adjustable to a suitable value less than 2.0 Do and a second diameter in a direction parallel to the junction plane which is fixed at a predetermined value greater than 1.8 Do, wherein the value Do is equal to a diameter of the beam with an intensity value being a central intensity value multiplied by $e^{-2}$.

2. A recording apparatus as claimed in claim 1, wherein the first diameter is adjustable in a range of 0.5 Do to 2.0 Do.

3. A recording apparatus as claimed in claim 1, wherein said aperture stop is attached to the collimator lens.

4. A recording apparatus as claimed in claim 1, wherein said aperture stop comprises a body member having a circular opening with a diameter greater than 1.8 Do and a pair of plate members being able to adjustably advance or retreat into the circular opening from opposite sides, wherein an advancing direction coincides with a normal direction.

5. A recording apparatus as claimed in claim 1, wherein said aperture stop comprises an elliptical iris diaphragm.

6. A recording apparatus as claimed in claim 1, wherein said aperture stop comprises a body member having an oval opening with a minor axis greater than 1.8 Do and a pair of plate members being able to adjustably advance into the oval opening from opposite sides, wherein the minor axis of the oval opening coincides with a parallel direction and an advancing direction of the plate members coincides with a normal direction.

7. A recording apparatus as claimed in claim 1, wherein said aperture stop comprises two plate members having elliptical openings and mounted adjacent each other and adapted to be rotated so that the elliptical openings cross each other.

8. In a laser printer having a semiconductor laser light source with a junction plane which produces a non-spherical laser beam, means for recording an impact of the laser beam and means for directing the laser beam from the laser source to the recording means, including means for collimating the beam with an F number equal to or less than 1.5, the improvement comprising:
    means, providing just behind the collimating means, for correcting the non-spherical laser beam to approximately a uniform spherical intensity distribution including an aperture stop assembly having an adjustable aperture opening, the aperture opening having a first diameter in a directional normal to the laser source junction plane which can be adjustable to a value less than 2.0 Do and a second diameter in a direction parellel to the junction plane which has a value greater than 1.8 Do, wherein the value Do is equal to a diameter of the laser beam with an intensity value equal to a central intensity value multiplied by $e^{-2}$; and
    means for adjusting the aperture opening.

* * * * *